US008751623B2

(12) United States Patent
Bose et al.

(10) Patent No.: US 8,751,623 B2
(45) Date of Patent: *Jun. 10, 2014

(54) REDUCTION OF ALERTS IN INFORMATION TECHNOLOGY SYSTEMS

(71) Applicant: International Business Machines Corporation, Armonk, NY (US)

(72) Inventors: Abhijit Bose, Paramus, NJ (US); Winnie W. Cheng, Tarrytown, NY (US); Shang Q. Guo, Cortland Manor, NY (US); Sang K. Kim, Urbana, IL (US); Laura Z. Luan, Scarsdale, NY (US); Dennis A. Perpetua, Jay, NY (US); Daniela Rosu, Ossining, NY (US); Mithkal M. Smadi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,123

(22) Filed: Jan. 11, 2013

(65) Prior Publication Data

US 2013/0132551 A1 May 23, 2013

Related U.S. Application Data

(63) Continuation of application No. 13/082,786, filed on Apr. 8, 2011, now Pat. No. 8,380,838.

(51) Int. Cl.
*G06F 15/16* (2006.01)
(52) U.S. Cl.
USPC ............................................ 709/223; 714/4.1

(58) Field of Classification Search
USPC ...................... 709/223, 224, 225; 714/4.1, 57
See application file for complete search history.

(56) References Cited

U.S. PATENT DOCUMENTS

| | | | |
|---|---|---|---|
| 5,893,905 A | 4/1999 | Main et al. | |
| 6,446,136 B1 | 9/2002 | Pohlmann et al. | |
| 6,684,247 B1 | 1/2004 | Santos et al. | |
| 6,966,015 B2 | 11/2005 | Steinberg et al. | |
| 7,171,689 B2 | 1/2007 | Beavers | |
| 7,318,178 B2 | 1/2008 | Steinberg et al. | |
| 7,430,692 B2 | 9/2008 | White, III et al. | |
| 7,487,408 B2 | 2/2009 | Echeverria et al. | |
| 7,784,099 B2 | 8/2010 | Benjamin | |
| 8,214,364 B2 * | 7/2012 | Bigus et al. | 707/737 |
| 2004/0168100 A1 | 8/2004 | Thottan et al. | |
| 2007/0300228 A1 | 12/2007 | White, III et al. | |
| 2008/0155517 A1 | 6/2008 | Yan et al. | |
| 2009/0201190 A1 | 8/2009 | Huthoefer et al. | |
| 2009/0271792 A1 | 10/2009 | Mills | |
| 2009/0292743 A1 * | 11/2009 | Bigus et al. | 707/202 |
| 2009/0293121 A1 * | 11/2009 | Bigus et al. | 726/22 |

* cited by examiner

*Primary Examiner* — Moustafa M Meky
(74) *Attorney, Agent, or Firm* — Alex Viderman; Mark Vallone; L. Jeffrey Kelly

(57) ABSTRACT

Aspects of the present invention dynamically reduce a frequency at which IT infrastructure automatically generates alerts. Historical data across a plurality of data sources in the IT infrastructure is analyzed. An opportunity to reduce the frequency at which the IT infrastructure automatically generates the alerts is identified. A new alert policy addressing the opportunity to reduce alert frequency is generated. An impact of the new alert policy on a set of predefined service level objectives (SLOs) and service level agreements (SLAs) is evaluated. The new alert policy is deployed in the IT infrastructure.

24 Claims, 5 Drawing Sheets

REDUCTION OF ALERTS IN INFORMATION TECHNOLOGY SYSTEMS

CROSS REFERENCE TO RELATED APPLICATION

This application is a continuation application of pending U.S. patent application Ser. No. 13/082,786, filed Apr. 8, 2011, status allowed.

TECHNICAL FIELD

The disclosure relates generally to alerts and more specifically to a method, computer program product, and computer system for reduction of alerts in information technology systems.

BACKGROUND

Today's large-scale Information Technology (IT) systems encompass multiple data centers, geographical locations, and diverse hardware and software platforms. Services are no longer confined to racks within a single data center—they may often be deployed and served from multiple locations. The management of large-scale IT infrastructure is becoming the focus for data center optimization and innovation. Within the area of service management, incident management is a main target for optimization because it is often a major portion of the work performed by the System Administrators (SAs) managing the system components. Other service management tasks include problem, change, and patch management.

Efficient management of IT operations and facilities is a major competitive advantage for service providers, given the massive scale and costs involved with today's IT service delivery infrastructures. In these environments, massive physical infrastructures (networking, power, cooling, security) exist to deploy and manage data centers, as well as run applications for different clients. System and application incidents and failures occur almost 24 hours a day, 7 days a week. Therefore, ideally, an incident management framework should be in place to respond to them in a timely manner and in accordance with customer Service Level Agreements (SLAs) and service delivery Service Level Objectives (SLOs). Proactive prevention and in-time response to failures with minimal operational costs is a major target for service providers. Proactive actions are typically enabled by the use of monitoring tools that allow SAs to observe in real-time the performance and status of the management components through sampling of Key Performance Indicators (KPIs). When KPI variation indicates that a managed component is in or approaching a state that would lead to an SLA or SLO violation, notification messages, called alerts, are automatically generated and sent to an SA. Alerts may be delivered by, for example, electronic mail messages or incident tickets in the Incident Management tools, or other means. The generation of monitoring alerts is typically determined by the monitoring policy deployed on the managed server. The policy may consist of one or more monitoring rules that describe conditions involving KPIs, processes, and other system operation components. Generally, alerts are generated when the conditions in the monitoring rules hold true. Sometimes, false positive alerts may be generated. A false positive is an alert that has been generated, for example, when the conditions in the monitoring rules hold true, even though the monitored system is performing properly and no SLA/SLO failure exists. An SA's time is not efficiently spent if he has to handle false-positive alerts. To reduce the number of alerts, in general, and of false alerts, monitoring rules typically need to be customized for fine details of the workload running on the managed systems.

In large-scale IT systems, substantial resources are typically required for managing the monitoring systems and for serving the monitoring alerts generated by these systems. Depending on the size and complexity, managing the IT infrastructure's operations can cost companies billions of dollars. Incident management systems such as IBM® Tivoli® and HP ServiceCenter® are examples of conventional approaches to handling the logging of monitoring alerts and incidents, dispatching them to appropriate system operators, and tracking their resolution. Furthermore, the timeliness in resolving these issues is critical, as IT service providers and clients have SLAs and SLOs that specify the maximum time-to-resolve for issues with different severity levels. Failure to meet SLAs often results in financial penalties and damages to the relationship with the clients.

SUMMARY

In one aspect, a method for dynamically reducing a frequency at which an IT infrastructure automatically generates alerts is provided. The method comprises a computer analyzing historical data across a plurality of data sources in the IT infrastructure. The method further comprises the computer, after performing the analysis of the historical data, identifying an opportunity to reduce a frequency at which the IT infrastructure automatically generates the alerts. The method further comprises the computer generating a new alert policy addressing the opportunity to reduce alert frequency. The method further comprises the computer evaluating an impact of the new alert policy on a set of predefined service level objectives (SLOs) and service level agreements (SLAs). The method further comprises the computer deploying the new alert policy in the IT infrastructure.

In another aspect, a computer program product for dynamically reducing the frequency at which an IT infrastructure automatically generates alerts is provided. The computer program product comprises one or more computer-readable tangible storage devices and program instructions stored on at least one of the one or more computer-readable tangible storage devices. The program instructions comprise first program instructions to analyze historical data across a plurality of data sources in the IT infrastructure. The program instructions further comprise second program instructions to identify an opportunity to reduce a frequency at which the IT infrastructure automatically generates the alerts. The program instructions further comprise third program instructions to generate a new alert policy addressing the opportunity to reduce the frequency. The program instructions further comprise fourth program instructions to evaluate an impact of the new alert policy on a set of predefined service level objectives (SLOs) and service level agreements (SLAs). The program instructions further comprise fifth program instructions to deploy the new alert policy in the IT infrastructure.

In another aspect, a computer system for dynamically reducing the frequency at which IT service monitoring infrastructure automatically generates alerts is provided. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise first program instructions to analyze historical data across a plurality of data sources in the IT infrastructure. The program instructions further comprise second program instructions to identify an opportunity to reduce a frequency at which the IT infrastructure automatically generates the alerts. The program instructions further comprise third program instructions to generate a new alert policy addressing the opportunity to reduce the frequency. The program instructions further comprise fourth program instructions to evaluate an impact of the new alert policy on a set of predefined service level objectives (SLOs) and service level agreements (SLAs). The program instructions further comprise fifth program instructions to deploy the new alert policy in the IT infrastructure.

DETAILED DESCRIPTION

Figure 1:
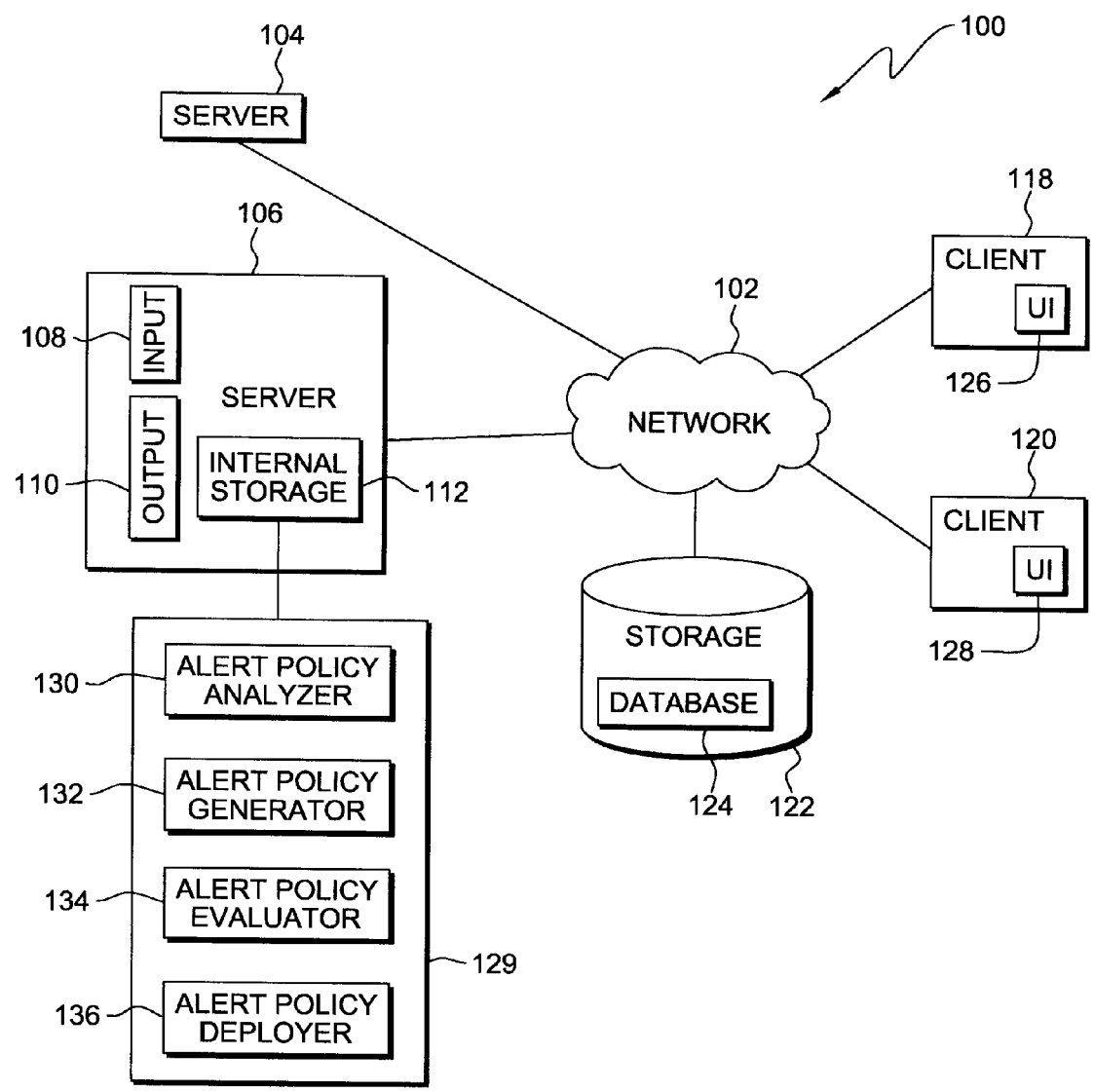
FIG. 1 is an illustration of a data processing environment depicted in accordance with an illustrative embodiment.

With reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 122. Client computers 118 and 120 connect to network 102. Client computers 118 and 120 may be, for example, mobile devices, telephones, cell phones, personal digital assistants, netbooks, laptop computers, tablet computers, desktop computers, and/or any other type of computing devices. In the depicted example, server computer 106 provides information, such as information computed locally or extracted from other computers on the network 102, to client computers 118 and 120. Server computer 106 may contain an input 108 and output 110 (an I/O device). Client computers 118 and 120 are clients to server computer 106 in this example. Client computers 118 and 120 may contain user interfaces (UIs) 126 and 128, respectively, that may display information and reports regarding a new alert policy and an evaluation of the new alert policy as well as accept commands and data entry from a user. UIs 126 and 128 can be, for example, graphical user interfaces (GUIs) or web user interfaces (WUIs). Network data processing system 100 may include additional server computers, client computers, displays and other devices not shown.

Alert policy application program 129 located in network data processing system 100 may be stored on one or more computer readable storage devices and downloaded to a data processing system or other device for use. Alert policy application program 129 may include various programs or program components, such as alert policy analyzer 130, alert policy generator 132, alert policy evaluator 134 and alert policy deployer 136. Alert policy analyzer 130, alert policy generator 132, alert policy evaluator 134 and alert policy deployer 136 may be stored on one or more computer readable storage devices, such as internal storage 112 on server computer 106, and downloaded to server 104 over network 102 for use in alert analysis.

Alert policy analyzer 130 may be, for example, a computer program or program component for analyzing the effectiveness of a current alert policy deployed in an IT service monitoring infrastructure and identifying an opportunity to reduce the frequency at which the IT service monitoring infrastructure automatically generates alerts. Alert policy generator 132 may be, for example, a computer program or program component for generating new policies addressing the opportunity to reduce the frequency of alerts. Alert policy evaluator 134 may be, for example, a computer program or program component for assessing the impact of newly generated alert policies on the IT service monitoring infrastructure. Alert policy deployer 136 may be, for example, a computer program or program component for interacting with the IT service monitoring infrastructure to deploy the newly generated alert policies. In one embodiment, alert policy analyzer 130, alert policy generator 132, alert policy evaluator 134, and alert policy deployer 136 run on the same server 106, as shown in FIG. 1. However, in various embodiments it may be necessary or desirable to run one or more of alert policy analyzer 130, alert policy generator 132, alert policy evaluator 134, and alert policy deployer 136 on different servers.

Data gathered, generated, and maintained for use by various programs listed herein may be kept in internal storage 112 of server computer 106 or in one or more databases 124 of storage unit 122.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation for the different embodiments.

In these examples, client computer 118 may be a client data processing system that may receive and/or display a feedback report generated by alert policy application program 129, which may include, for example, information about a new alert policy and an evaluation of the new alert policy. Alert policy analyzer 130, alert policy generator 132, alert policy evaluator 134, and alert policy deployer 136 reside within alert policy application program 129 and may be localized on one server 106 and/or distributed between two or more servers. Alert policy application program 129 may communicate via local and/or remote processes, such as in accordance with a signal having one or more data packets (for example, but not limited to, data from one program interacting with another program in a local system, distributed system, and/or across a network 102 with other systems via the signal).

Figure 2:
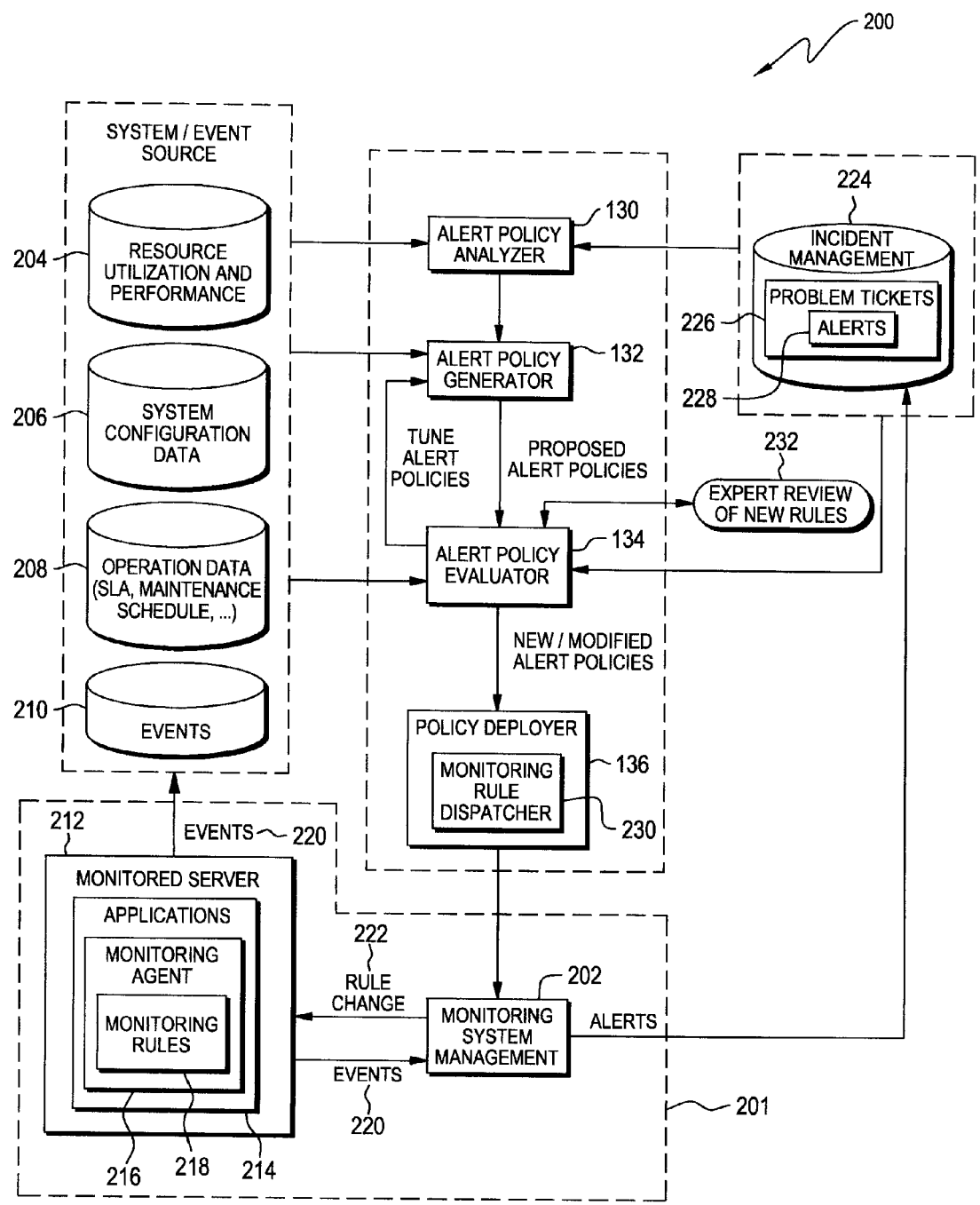
FIG. 2 is a block diagram of an illustrative embodiment integrated within a typical IT service management infrastructure.

Turning now to FIG. 2, a block diagram of an illustrative embodiment integrated within a typical IT service management infrastructure is depicted. IT service management infrastructure 200 is an environment in which illustrative embodiments may be implemented. In this example, service management infrastructure 200 includes a monitoring infrastructure 201, a number of data sources containing data about monitored system events 220, such as resource utilization and performance data source 204 and events data source 210, and data sources related to other components of the service management infrastructure 200, such as incident management data source 224, system configuration data source 206, and operation data source 208. The IT service management infrastructure 200 may further comprise one or more monitored servers, such as monitored server 212. Monitored server 212 may comprise a processor (not shown), dynamic and persistent memory (not shown) and may run various applications 214, for example, but not limited to, monitoring agent 216, which may be enabled to monitor the performance of the operations of monitored server 212 and generate monitoring events 220 based on a variety of monitoring rules 218.

The operations of monitored servers, such as the monitored server 212 depicted in FIG. 2, are generally characterized by one or more "events" 220. An event is any occurrence within monitored server 212. For example, the occurrence of certain identifiable software or hardware errors may be considered an event 220. Processor operations such as interrupts and context switches are also examples of events 220. Some events 220 are advantageous to monitor, and others are not. Relevant events 220 are necessarily determined on a case-by case basis that is unique to the monitored server 212 based on the business priorities of those managing service management infrastructure 200.

Monitoring infrastructure 201 may also monitor more general performance criteria for the monitored server 212. Monitoring agent 216 may gather performance criteria factors such as average processor utilization, memory utilization, and percent of file system utilization. Monitoring agent 216 may report the gathered information in the variety of heterogeneous data repositories, such as resource utilization and performance data source 204, system configuration data source 206, operation data source 208, events data source 210, and incident management data source 224. In this regard, monitoring rules 218 may govern the various performance criteria that are monitored. It is advantageous to allow monitoring rules 218 to be updated with the new rules 222 that may give new events 220 and new performance criteria to gather. Thus, it is generally advantageous to have monitoring agent 216 capable of loading new and updated monitoring rules 218, if necessary, as business priorities and configurations of monitored server 212 change.

In the course of developing the invention, the inventors found that proactive prevention and in-time response to failures with minimal operational costs is a major target for IT service providers. The typical approach in datacenters is to setup the vast majority of servers in an IT service management infrastructure with default monitoring rules. The service management infrastructure typically propagates and aggregates monitoring events, and, eventually, provides input to system administrators in the form of alerts or incident tickets. System administrators typically manually analyze the alerts or tickets and take corrective actions if necessary. However, often, no corrective action is needed because the alert was a false-positive in the identification of critical situations. Such alerts are called 'false alerts' or 'ignorable alerts'. False alerts typically occur when monitoring rules fail to capture sufficient detail on the parameters governing a critical situation or when imprecise thresholds are set overly conservatively in fear of missing high-risk SLA failures. Therefore, for a competitive IT service delivery, it is desirable to minimize false alerts to reduce operational costs. Existing technology has limited capability and information that could be utilized to take corrective actions.

Various embodiments of alert policy analyzer 130, alert policy generator 132 and alert policy evaluator 134 may be integrated with a variety of management systems and data sources to query and correlate information. These data sources include, but are not limited to, server resource utilization and performance data source 204, system configuration data source 206, operation data source 208, and incident management data source 224, as shown in FIG. 2. Various embodiments of policy deployer 136 may interact with the monitoring system 201 to enable automated policy deployment.

Figure 3:
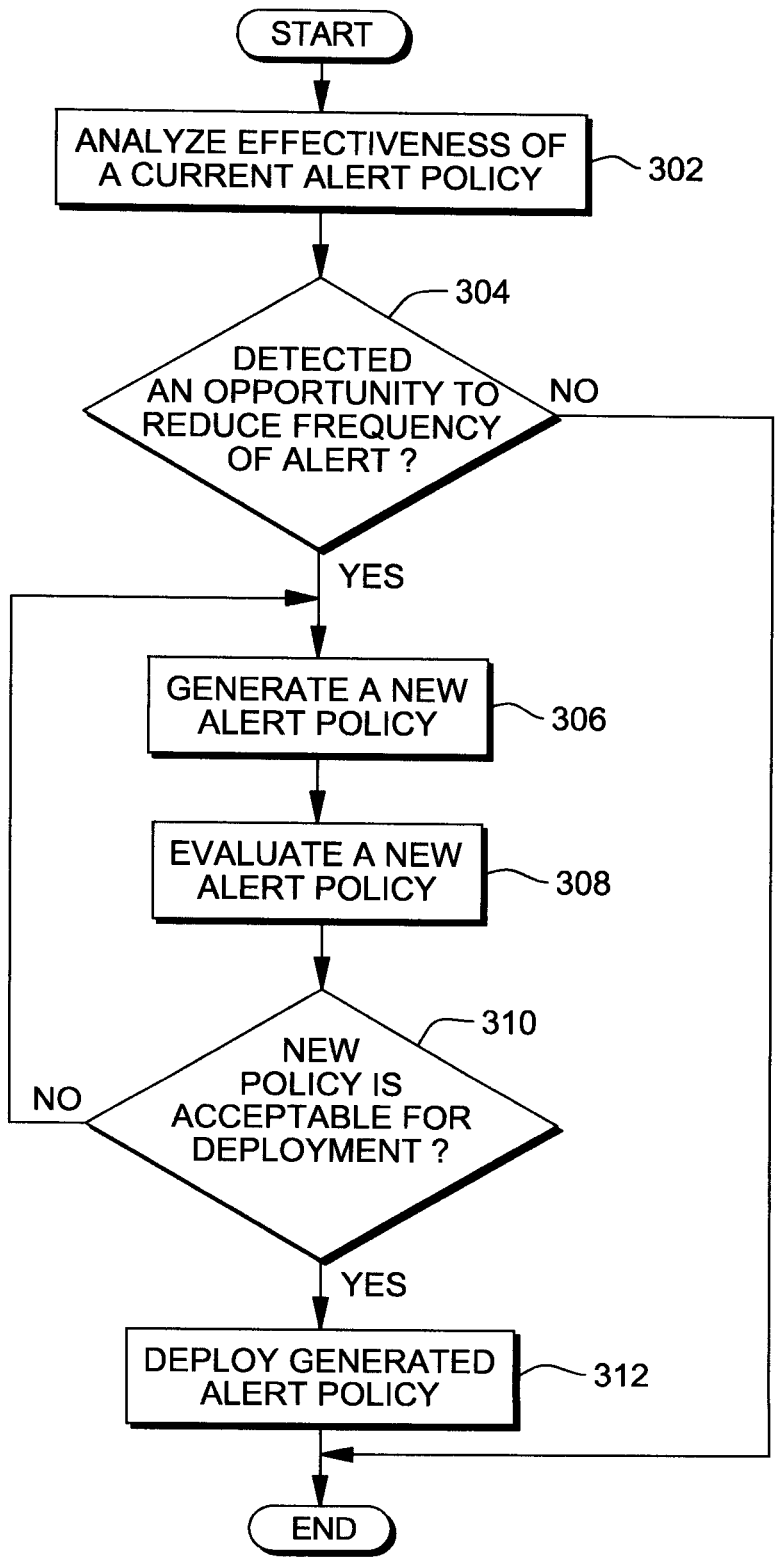
FIG. 3 is a flowchart of a process for dynamically reducing a frequency at which an IT service monitoring infrastructure automatically generates alerts.

Referring now to FIG. 3, a flowchart of a process for dynamically reducing a frequency at which IT service monitoring infrastructure 201 automatically generates alerts is depicted in accordance to an illustrative embodiment. At step 302, alert policy analyzer 130 performs an analysis of current alert policy effectiveness, for example, in response to a directive from Monitoring System Management 202, or to a directive from an SA accessing UI 126, or a scheduler of periodic jobs.

Alert policy analyzer 130 may employ a variety of machine-learning techniques to model system behavior and assess the effectiveness of alert policies. Alert policy analyzer 130 may leverage a large set of historical data from the service management infrastructure 200 shown in FIG. 2. Historical data may include data stored in, for example, but not limited to, resource utilization and performance data source 204, system configuration data source 206, incident management data source 224, events data source 210, and operations data source 208. Alert policy analyzer 130 may identify opportunities to reduce the frequency at which IT service monitoring infrastructure 200 automatically generates the alerts by detecting false alerts. Alert policy analyzer 130 may detect false alerts by performing data mining or correlation among the data from the data stored in, for example, but not limited to, resource utilization and performance data source 204, system configuration data source 206, incident management data source 224, events data source 210, and operations source data 208.

Various aspects of the present invention recognize that an alert may be triggered by one or more monitoring events 220, and an event 220 is typically generated by a monitoring rule 218 that is part of the deployed monitoring policy. Generally, a monitoring rule is defined by any user-specified predicate over the KPIs. For example, a monitoring rule may specify a counter threshold, and may require an alert to be sent when such threshold is met. It is noted that various embodiments only consider threshold-based alert policies. Generally, alert policies may trigger alerts at times when there is no actual critical situation. For example, this may happen when policies for performance criteria factors such as CPU, memory or file system utilization are set at thresholds that are too low or when these performance factors are temporarily impacted by a scheduled maintenance process, such as system backup process. Such false-positive signals represent an opportunity to reduce frequency of alerts, if they represent a majority of the total alert volume.

Alert policy analyzer 130 can reduce false-positives with detailed analysis and fine-tuning of alert policies. For example, alert policy analyzer 130 can identify opportunities to reduce the frequency of alerts by learning from the resolutions of historical incident tickets 226 about the alert instances considered to be ignorable (false alerts). In one embodiment, alert policy analyzer 130 may be configured to obtain historical data from incident management data source 224, which contains historical data about prior alerts 228 and may be implemented to consider only threshold-based alert policies. For this purpose, alert policy analyzer 130 may separate the incident tickets 226 that are generated based on threshold-based alerts 228 from other incident tickets, such as those generated based on human input. Alert policy analyzer 130 may accomplish this separation by searching for certain special patterns in the incident description. Monitoring infrastructure 201 may add the special patterns when issuing the alerts 228. Generally, the patterns have well-defined structures and entity-value expressions. Furthermore, incident tickets 226, including those related to alerts 228, typically contain several fields including, for example, but not limited to, incident occurred time, problem description, and solution description (which becomes available after incidents are resolved).

After alert policy analyzer 130 identifies incident tickets that are related to machine-generated alerts 228, alert policy analyzer 130 may classify the incident tickets 226 based on their solution fields. Alert policy analyzer 130 can employ various classification (explicitly or implicitly trained) schemes or systems (for example, but not limited to, boosting classifiers, transduction classifiers, inductive classifiers, support vector machines, neural networks, expert systems, Bayesian belief networks, fuzzy logic, data fusion engines). Alert policy analyzer 130 can classify incident tickets 226 that are related to machine-generated alerts 228 into two types: true alerts (such as actual critical situations occurred that required SA intervention) and false alerts (such as ignorable events, with no critical or new situation occurring). References throughout this specification to "false alerts" mean alerts that are either (1) duplicative, (2) not reproducible, or (3) have no action taken in their resolutions. In this illustrative embodiment, alert policy analyzer 130 may be configured to communicate these classified alerts to alert policy generator 132 for further analysis and determination how alert policies should be modified.

In another aspect of the present invention, alert policy analyzer 130 may aggregate the monitored server's 212 attributes across a plurality of service domains (for example, IT service management infrastructure 200 may include different domains for different customers and different monitoring technologies). Alert policy analyzer 130 may aggregate the monitored server's 212 attributes across the plurality of service domains by utilizing a pre-existing integration of domain specific data sources, such as resource utilization and performance data source 204, system configuration data source 206, operation data source 208, and events data source 210. The aggregation may involve alert policy analyzer 130 analyzing data at levels of groups of servers across the domains that have similar features, such as hardware or software configuration, operating systems, applications, server type or role. This aggregation of information related to IT service management infrastructure 200 advantageously enables the alert policy analyzer 130, alert policy generator 132 and alert policy evaluator 134 to generate a more accurate representation of the managed resources and alerts related to those managed resources. Thus, aggregation across a plurality of domains typically results in generation of more effective policies.

If at step 304, alert policy analyzer 130 detects an opportunity to reduce frequency of alerts, alert policy generator 132 further analyzes the classified alerts and generates new alert policies at step 306. Alert policy generator 132 may apply several techniques known in the art to generate new policies that result in fewer alerts. Such techniques may include, for example, but not limited to, the change of thresholds in existing KPI conditions, adding new conditions that involve KPI or system parameters, or adding time-based elements to existing conditions. In an exemplary embodiment presented herein, alert policy generator 132 generating new policies is equivalent to alert policy generator 132 automatically adapting the threshold values of at least one monitoring rule 218. In various embodiments of the present invention, alert policy generator 132 may use a number of dynamic threshold adaptation techniques, such as the technique described herein in conjunction with FIG. 4. The choice of techniques generally depends on the constructs available in the policy language and the optimization goals. An exemplary optimization goal for tuning the threshold may be, for example, not to miss any true alerts (do not generate any false negatives). An alternative goal may be to accept missing alerts. In other words, it might be acceptable to miss a true alert, provided a new one will be generated soon enough for timely resolution if the critical situation still persists.

At step 308, alert policy evaluator 134 assesses the impact of new policies generated by alert policy generator 132. In one embodiment, alert policy evaluator 134 may evaluate the impact of new policies by simulating policies generated by alert policy generator 132 against historical data from heterogeneous data sources including, but not limited to, resource utilization and performance data 204, system configuration data 206, operation data 208, and incident management data 224. From the simulation, alert policy evaluator 134 can calculate a projected reduction score. The projected reduction score is a numerical value that represents savings in terms of false alerts that would be removed from service management infrastructure 200 while ensuring that SLA and SLO are satisfied.

In addition to calculating the projected reduction score, alert policy evaluator 134 may verify that various SLA objectives are satisfied. As previously indicated, SLAs typically specify the maximum time-to-resolve for issues with different severity level. In one embodiment, alert policy evaluator 134 implements SLA/SLO compliance by verifying that true incidents are not missed due to algorithmic threshold adjustments as described in conjunction with FIG. 4.

For example, alert policy evaluator 134 may evaluate benefits and risks of new policies by generating a benefit model that reflects the expected alert reduction rate across monitored server 212 and a risk model that reflects the expected risk with regards to SLA misses. Alert policy evaluator 134 generates, as the resulting output of this evaluation process and for a new monitoring policy, a projected accuracy score that measures the risk of failing SLAs, and a projected reduction score that measures the alert reduction if the new monitoring policy is deployed in the service management infrastructure 200.

In an exemplary embodiment, alert policy evaluator 134 may determine the projected accuracy score by correlating the following types of information: 1) SLA/SLO specific features that describe dependency of SLA/SLOs on KPIs and delay in detecting critical variation; and 2) alert specific features that describe relevance of alert for SLA/SLO types. Alert policy evaluator 134 can use these two types of information to assess the relevance of each specific alert to each specific SLA/SLO, and further to derive the impact of alert thresholds, sampling delays, and discard patterns.

Typically, SLA/SLO specific features may include the type of KPIs relevant for the SLA/SLOs. For instance, SLAs/SLOs can be dependent on application response time KPI, on service available KPI (which may be assessed, for example, as response to service request), or on server available KPI (which may be assessed, for example, as the response to ping command) Other SLA/SLO specific features may include SLA acceptable level for system behavior, represented as KPI thresholds. For instance, an SLA/SLO specific feature may specify that the upper threshold of 7 seconds for response time KPI values represents acceptable behavior. This information may be described by the probability distribution of SLA/SLO failure when the KPI is above a variable threshold. Another SLA/SLO specific feature may include the SLA/SLO-specific acceptable delay to initiate the recovery action in order to resolve the incident by the SLA/SLO specific deadline. For instance, if an SLA related to service availability specifies resolution deadline as 1 hour, the acceptable delay to start recovery may be, for example, 15 minutes.

The alert-specific features that describe the impact on SLAs/SLOs may comprise the list of KPIs and related thresholds that are included in the alert condition. For example, alert conditions may include the service response time KPI with a threshold of 6.5 seconds or the server available KPI with a threshold of 2 (consecutive failed retries). Another example of an alert feature may include the notification delay (the delay between the time of a system state change that causes the KPI to pass the threshold and the time when the alert is generated), which may be determined by the sampling period of the KPI and pattern of discarding (ignoring) the KPI conditions that is described by the alert condition. For instance, a maximum value for this delay may be represented by formula:

max(notification delay)=(<number of times the KPI value over threshold is ignored>+1)*KPI sampling period.

Similarly, the average value of the notification delay may be represented by formula:

avg(notification delay)=(<number of times the KPI value over threshold is ignored>+0.5)*KPI sampling period.

As will be apparent to a person skilled in the art, the values used for the various types of calculations related to SLA/SLOs and alerts that are described above can be determined by analysis of various data sources within IT service management infrastructure 200, such as resource utilization and performance 204, system configuration 206, operation data 208, and the like. For instance, relevant analysis results may include the likelihood of SLA/SLO ailing when KPI is over a specific threshold and the notification allowance (the upper bound on notification delay that allows for proper execution of recovery actions before SLA deadline).

Based on the SLAs/SLOs and alert analysis described above, alert policy evaluator 134 can assess the SLA risk caused by a new or modified alert condition created by alert policy generator 132. In an exemplary embodiment, alert policy evaluator 134 may employ the following algorithm for risk assessment:

1) For a new alert, determine all SLAs dependent on KPIs that are tested in the alert condition.

2) For each such SLA, evaluate the risk of failure based on the likelihood that the SLA fails when KPI is below the threshold specified in the alert condition (this risk value will be referred to herein as Pmiss).

3) Evaluate a weight factor related to notification delay (referred to herein as Nmark). Alert policy evaluator 134 uses the weight factor to quantify whether the alert notification delay is critical for the SLA/SLO recovery. For instance, alert policy evaluator 134 may assign Nmark a numerical value of 10 if average alert notification delay is over SLA notification allowance. Similarly, alert policy evaluator 134 may assign Nmark a value of 1 if maximum alert notification delay is larger than the SLA notification allowance, and may otherwise assign a value of 0.

4) Calculate an overall risk value by summing up (for all related SLAs) the following value: (1−Pmiss)*Nmark+Pmiss*100.

It should be appreciated that the risk assessment algorithm described above is only provided as an illustration of one implementation of risk assessment technique and is not intended to imply any limitations with regards to different risk assessment techniques that may be implemented by various embodiments.

In an exemplary embodiment, alert policy evaluator 134 may compute the projected reduction score as the average number of alerts eliminated in a day. Alternatively, alert policy evaluator 134 can utilize different time periods, such as a week or a month, to assess the reduction of alerts. Alert policy evaluator 134 may assess the daily reduction by employing a simulation technique. Alternatively, alert policy evaluator 134 may assess the daily reduction based on modeling of monitored server's 212 behavior by employing a statistical approach. Alert policy evaluator 134 may compute the projected accuracy score as the ratio between the projected reduction score and the risk of failing SLAs value.

At step 310, a decision as to whether the projected accuracy and the projected reduction are acceptable for deployment is made. In one embodiment, alert policy evaluator 132 can automatically make this decision if the projected accuracy and reduction scores are above criteria pre-defined by system administrators. Alternatively, UI 126 may present policies with lower projected scores to system administrators (designated by element 232 of FIG. 2) for verification instead of being automatically deployed. The system administrators will have an ability to accept or reject policies generated by alert policy generator 132. This fine-tuning can be an iterative process. In other words, steps 306 and 308 can be repeated iteratively until policies with desired accuracy and alert reduction rate are generated.

In some embodiments, alert policy analyzer 130 may limit the policy analysis (step 302), and alert policy evaluator 134 may limit the evaluation (step 308), to a specific monitored server 212. Alternatively, alert policy analyzer 130 may encompass the policy analysis (step 302), and alert policy evaluator 134 may encompass the evaluation (step 308) to a large set of monitored servers (not shown in FIG. 2) classified into groups based on pre-defined similarity characteristic. Similarity can be defined by, for instance, but not limited to, server type (Web server, database server, or the like), the hardware configuration (CPU, memory, disk type, or the like), applications installed, server execution context (maintenance/security process), operations data, resource utilization patterns, or geographical location. Advantageously, analyzing and evaluating policies for a large set of similar servers may increase an effectiveness of false alert reduction.

At step 312, alert policy deployer 136 dynamically deploys the accepted alert policies generated by alert policy generator 132. In one exemplary embodiment, alert policy evaluator 134 may place the accepted alert policies in a policy deployment package that is passed to alert policy deployer 136. Alert policy deployer 136 may be configured to interact with monitoring system management 202 of the monitoring infrastructure 201 via monitoring rule dispatcher 230 to deploy the newly generated policy packages. Alert policy deployer 136 may use the internal specification of new policies to generate the necessary details about monitoring rules 218 specific to the monitoring infrastructure 201. In this illustrative embodiment, alert policy deployer 136 may implement appropriate staging of requests for policy deployment to minimize disruptions on IT service management infrastructure 200 in general, and monitored server 212 in particular. The assessment on server-specific risks/costs due to delaying the policy deployment will be the base for deciding the staging order and timeline.

Before deployment of policies that are created based on integration of data across multiple domains, alert policy deployer 136 may customize these policies to match the specific characteristics of the domain targeted for deployment. The customization may be performed with respect to, for example, but not limited to monitoring component scope (for example, servers, middleware components), type of rules (for example, resource utilization, availability, service response times), benefit versus risk trade-offs (for example, lower bound on expected alert reductions versus upper bound on expected risk increase), manual supervision (for example, fully automated deployment versus human acknowledged deployment). Monitoring system management 202 may deploy the customized alert policies at the monitored server 212 during a pre-defined maintenance window.

In addition to various hardware and software components, various interfaces can be provided to interact with the alert policy analyzer 130, alert policy generator 132, alert policy evaluator 134, and alert policy deployer 136. These interfaces may include, for example, but not limited to, a graphical user interface (GUI) such as an embodiment of UI 126, a command line interface, a speech interface, and a Natural Language text interface. Such interfaces may be associated with an engine, server, client, editor tool or web browser although other types of applications may be utilized.

The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate interactions with various components. In addition, the GUI can also include a plurality of other inputs or controls for adjusting and configuring one or more aspects.

In addition to various interfaces, alert policy application program 129 may provide a variety of dynamically generated reports. For example, such reports may provide information about the new alert policy and an evaluation of the new alert policy. More specifically, such reports may include information about observed false-alert patterns and justifications for various decisions regarding new policy generation and deployment. Reports can also be exported in formats such as HTML, TIFF, CSV, or XML file formats. Reports may be created using commercial or custom-built reporting tools, or a combination thereof.

Figure 4:
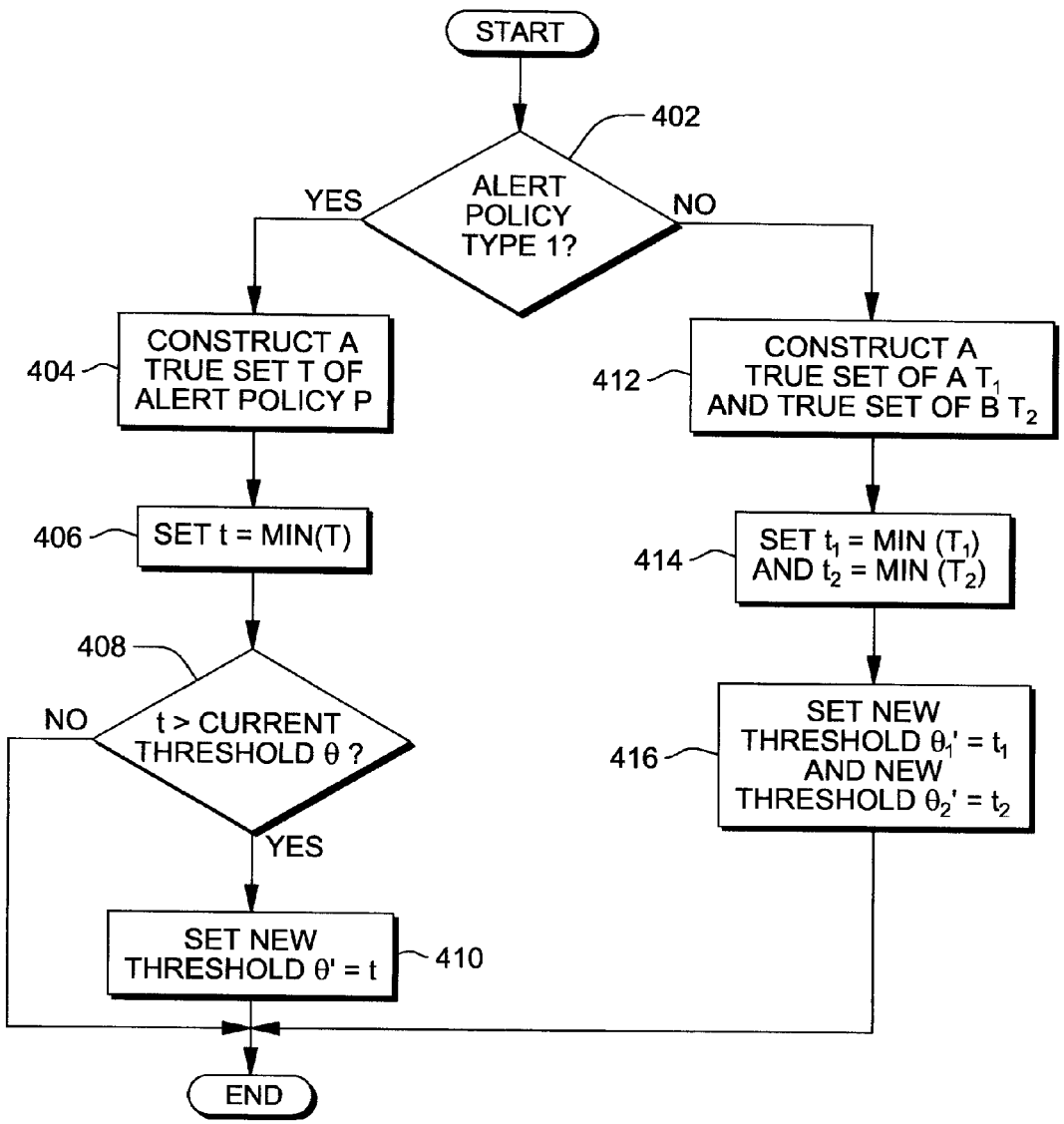
FIG. 4 is a flowchart of an illustrative algorithm describing how to tune threshold values in order to dynamically reduce frequency of false alerts in accordance with an illustrative embodiment.

FIG. 4 is a flowchart of an illustrative algorithm describing how to tune threshold values in order to dynamically reduce frequency of false alerts in accordance with an illustrative embodiment. The examples and algorithm described in conjunction with FIG. 4 are based on IBM® Tivoli® policy specification language. In one illustrative embodiment alert policy generator 132 may employ the algorithm to implement an alert policy threshold adaptation technique. For simplicity of discussion, assume that there are three basic alert policy types, namely (i) IF A (hereinafter referred to as type 1); (ii) IF A AND B (hereinafter referred to as type 2); and (iii) IF A OR B (hereinafter referred to as type 3), wherein A and B are predicate units comprising one parameter and its corresponding threshold value. The first alert policy type is the smallest form of a predicate unit, while the other two alert policy types are either a conjunction (type 2) or a disjunction (type 3) of two predicates of the first type. The following examples illustrate three basic types of alert policies:

1. IF (System.Virtual_Memory_Percent_Used>90)
2. IF (NTphysical_Disk.Disk_Time>80) AND (NT_Physical_Disk.Disk_Time<=90)
3. IF (SMP_CPU.CPU_status='off-line') OR (SMP_CPU.Avg_CPU_Busy__15>95)

The first example represents an alert policy of type 1, wherein a predicate A (System.Virtual_Memory_Percent_Used>90) comprises one parameter (System.Virtual_Memory_Percent_Used) and its corresponding threshold value (90). Similarly, the second example represents an alert policy of type 2, wherein a predicate A (NTphysical_Disk.Disk_Time>80) comprises one parameter (NTphysical_Disk.Disk_Time) and its corresponding threshold value (80) and a predicate B (NT_Physical_Disk.Disk_Time<=90) comprises one parameter (NTphysical_Disk.Disk_Time) and its corresponding threshold value (90). This policy type illustrates a conjunction of predicates A and B. Finally, the last example represents an alert policy of type 3, which illustrates a disjunction of two predicates. The algorithm described below can be applied to more complex alert policies that are composites of numerous predicates by converting the complex expression into a conjunctive normal form. Hereinafter, a "true set" of an alert policy P means the set of observed parameter values for the events triggered by alert policy P that generated true alerts (hereinafter referred to as "true events").

As previously indicated, an exemplary algorithm of FIG. 4 describes how to tune the threshold value in order to reduce the number of false alerts and may be employed by an alert policy generator 132. At step 402, alert policy generator 132 determines whether the analyzed alert policy P is of type 1. If alert policy generator 132 determines that the analyzed alert policy P is of type 1, then at step 404, alert policy generator 132 constructs a true set T of P based on historical data of resource and performance metrics 204 and alerts 228.

In an exemplary embodiment, alert policy generator 132 computes the true set T of P as follows: for each true alert 228, alert policy generator 132 analyzes the incident ticket 226 description to determine time of occurrence, related server, and observed parameter value(s). If parameter value is defined in the ticket description (for example, the alert message), then alert policy generator 132 adds this value to T. Otherwise, alert policy generator 132 retrieves the value of the parameter from the repository for resource and performance metrics 204 for the server and time identified in the incident ticket 226 description.

At step 406, alert policy generator 132 sets the variable t to equal the smallest performance metric that triggered true alert (min(T)). At step 408, alert policy generator 132 determines whether t is bigger than the original threshold value θ. At step 410, in response to determining that t>θ, alert policy generator 132 sets the new threshold value θ' equal to t. As an example, assume that policy P governs CPU threshold, if all true alerts happen for thresholds greater than or equal to 95%, alert policy generator 132 raises the new threshold θ' from the original threshold θ of 90% to 95%.

If, at step 402, alert policy generator 132 determines that the analyzed alert policy P is of type 2 or type 3, step 412 is performed next. A determination that the analyzed alert policy P is of type 2 or type 3 means that the alert policy P consists of either a conjunction or a disjunction of two predicate units A and B, where A has one parameter $p_1$ and its corresponding threshold $\theta_1$, and predicate B has one parameter $p_2$ and its corresponding threshold $\theta_2$. At step 412, alert policy generator 132 calculates the true sets $T_1$ (true set of A) and $T_2$ (true set of B) of P based on historical data of performance metrics, events, and alerts. At step 414, alert policy generator 132 sets the variables $t_1$ and $t_2$ to equal the smallest performance metric that triggered A ($\min(T_1)$) and the smallest performance metric that triggered B ($\min(T_2)$), respectively. At step 416, alert policy generator 132 sets the new threshold value $\theta_1'$ equal to $t_1$ and the new threshold value $\theta_2'$ equal to $t_2$. Alert policy generator 132 can repeat steps 402 through 416 for each rule in the monitoring policy.

In this exemplary embodiment, alert policy generator 132 may be configured to communicate modified alert policies with adjusted threshold values to alert policy evaluator 134. It should be appreciated that algorithm of FIG. 4 is only provided as an illustration of one implementation of threshold adaptation technique and is not intended to imply any limitations with regards to different threshold adaptation techniques that may be implemented by various embodiments.

Figure 5:
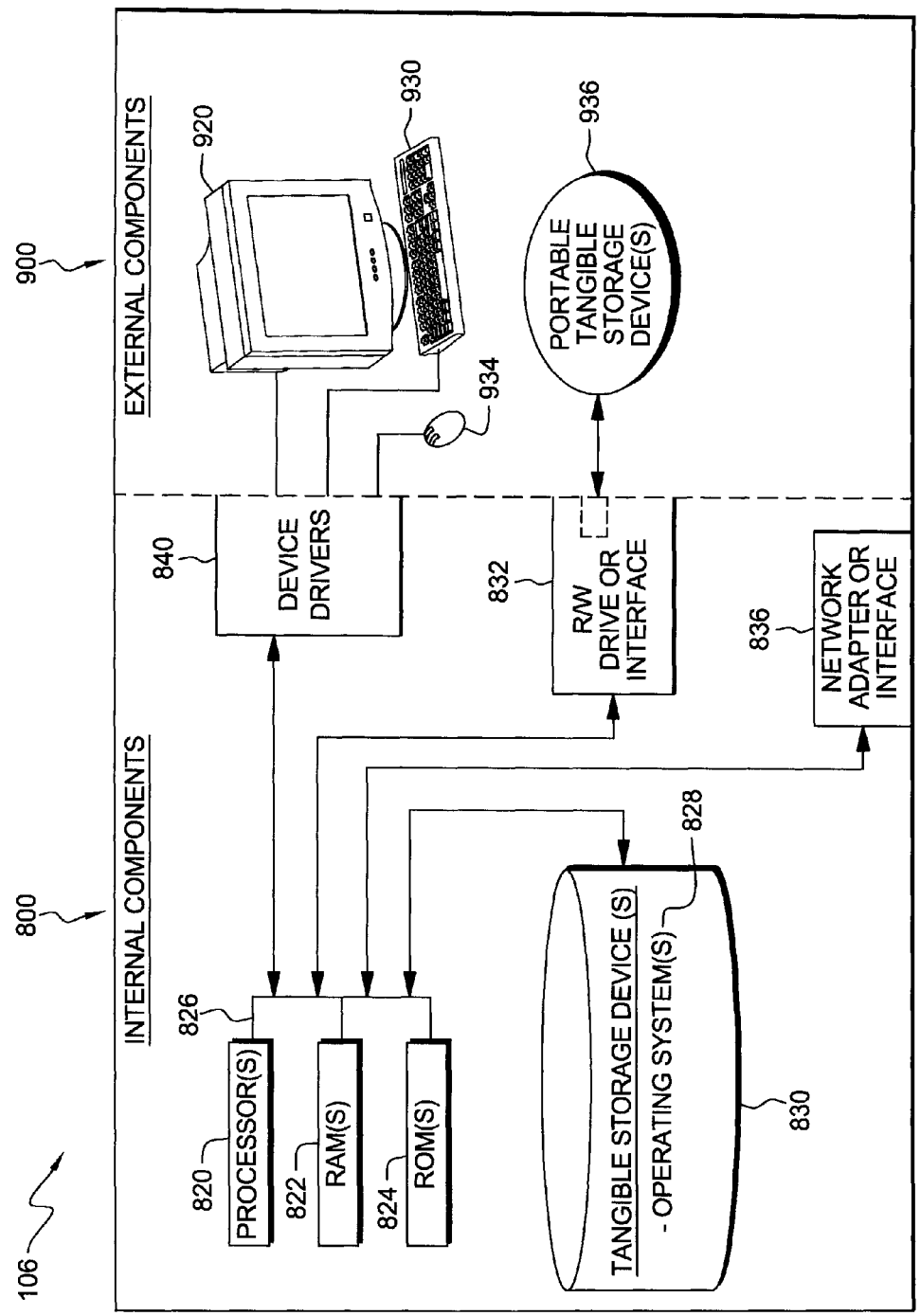
FIG. 5 illustrates internal and external components of a server computer in accordance with an illustrative embodiment.

FIG. 5 illustrates internal and external components of server computer 106 in accordance with an illustrative embodiment. Server computer 106 includes internal components 800 and external components 900. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828, alert policy analyzer 130, alert policy generator 132, alert policy evaluator 134, and alert policy deployer 136 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The alert policy analyzer 130, alert policy generator 132, alert policy evaluator 134, and alert policy deployer 136 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The alert policy analyzer 130, alert policy generator 132, alert policy evaluator 134, and alert policy deployer 136 can be downloaded to computer sever 106 from an external computer via a network (for example, the Internet, a local area network or other, wide area network) and network adapter or interface 836. From the network adapter or interface 836, the alert policy analyzer 130, alert policy generator 132, alert policy evaluator 134, and alert policy deployer 136 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Alert policy analyzer 130, alert policy generator 132, alert policy evaluator 134, and alert policy deployer 136 can be written in various programming languages including low-level, high-level, object-oriented or non object-oriented languages. Alternatively, the functions of alert policy analyzer 130, alert policy generator 132, alert policy evaluator 134, and alert policy deployer 136 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for dynamically reducing a frequency at which an information technology (IT) infrastructure automatically generates alerts, the method comprising the steps of:
at least one processor identifying an opportunity to reduce a frequency at which the IT infrastructure automatically generates the alerts, the identifying comprising detecting, using historical data from a plurality of data sources in the IT infrastructure, false alerts generated in the IT infrastructure;
generating a new alert policy that addresses the opportunity to reduce the frequency; and
performing a simulation of applying the new alert policy in the IT infrastructure using historical data from a plurality of data sources in the IT infrastructure.

2. The method of claim 1, further comprising the step of deploying the new alert policy in the IT infrastructure.

3. The method of claim 1, further comprising calculating, based on the simulation, a projected reduction in false alerts that, by applying the new alert policy in the IT infrastructure, would occur in the IT infrastructure while ensuring that service level agreements and service level objectives are satisfied.

4. The method of claim 1, wherein the step of identifying the opportunity to reduce the frequency at which the IT infrastructure automatically generates the alerts comprises the computer classifying a plurality of incident tickets based on a solution field.

5. The method of claim 1, wherein the step of generating the new alert policy addressing the opportunity to reduce the frequency comprises the computer adjusting a threshold associated with a current alert policy of the IT infrastructure.

6. The method of claim 1, further comprising the at least one processor assessing the risk of applying the new alert policy in the IT infrastructure.

7. The method of claim 6, wherein the assessing step comprises the determining the impact of the new alert policy on a plurality of Key Performance Indicators (KPIs).

8. The method of claim 1, further comprising generating a benefit model representing an expected alert reduction rate across the IT infrastructure.

9. A computer program product for dynamically reducing the frequency at which an information technology (IT) infrastructure automatically generates alerts, the computer program product comprising one or more computer-readable tangible storage devices and program instructions stored on at least one of the one or more computer-readable tangible storage devices, the program instructions comprising:
   program instructions to identify an opportunity to reduce a frequency at which the IT infrastructure automatically generates the alerts, the program instructions to identify the opportunity to reduce the frequency comprising program instructions to detect, using historical data from a plurality of data sources in the IT infrastructure, false alerts generated in the IT infrastructure;
   program instructions to generate a new alert policy that addresses the opportunity to reduce the frequency; and
   program instructions to perform a simulation of applying the new alert policy in the IT infrastructure using historical data from a plurality of data sources in the IT infrastructure.

10. The computer program product of claim 9, further comprising program instructions to deploy the new alert policy in the IT infrastructure.

11. The computer program product of claim 9, further comprising program instructions to calculate, based on the simulation, a projected reduction in false alerts that, by applying the new alert policy in the IT infrastructure, would occur in the IT infrastructure while the program instructions to calculate the projected reduction ensure that service level agreements and service level objectives are satisfied.

12. The computer program product of claim 9, wherein the program instructions to identify the opportunity to reduce the frequency comprise program instructions to classify a plurality of incident tickets based on a solution field.

13. The computer program product of claim 9, wherein the program instructions to generate a new alert policy addressing the opportunity to reduce the frequency comprise program instructions to adjust a threshold associated with a current alert policy of the IT infrastructure.

14. The computer program product of claim 9, further comprising program instructions to assess the risk of applying the new alert policy in the IT infrastructure.

15. The computer program product of claim 14, wherein the program instructions to assess the risk of applying the new alert policy comprise program instructions to determine the impact of the new alert policy on a plurality of Key Performance Indicators (KPIs).

16. The computer program product of claim 9, further comprising program instructions to generate a benefit model representing an expected alert reduction rate across the IT infrastructure.

17. A computer system for dynamically reducing the frequency at which an information technology (IT) infrastructure automatically generates alerts, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to identify an opportunity to reduce a frequency at which the IT infrastructure automatically generates the alerts, the program instructions to identify the opportunity to reduce the frequency comprising program instructions to detect, using historical data from a plurality of data sources in the IT infrastructure, false alerts generated in the IT infrastructure;
   program instructions to generate a new alert policy that addresses the opportunity to reduce the frequency; and
   program instructions to perform a simulation of applying the new alert policy in the IT infrastructure using historical data from a plurality of data sources in the IT infrastructure.

18. The computer system of claim 17, further comprising program instructions to deploy the new alert policy in the IT infrastructure.

19. The computer system of claim 17, further comprising program instructions to calculate, based on the simulation, a projected reduction in false alerts that, by applying the new alert policy in the IT infrastructure, would occur in the IT infrastructure while the program instructions to calculate the projected reduction ensure that service level agreements and service level objectives are satisfied.

20. The computer system of claim 17, wherein the program instructions to identify the opportunity to reduce the frequency comprise program instructions to classify a plurality of incident tickets based on a solution field.

21. The computer system of claim 17, wherein the program instructions to generate a new alert policy addressing the opportunity to reduce the frequency comprise program instructions to adjust a threshold associated with a current alert policy of the IT infrastructure.

22. The computer system of claim 17, further comprising program instructions to assess the risk of applying the new alert policy in the IT infrastructure.

23. The computer system of claim 22, wherein the program instructions to assess the risk of applying the new alert policy comprise program instructions to determine the impact of the new alert policy on a plurality of Key Performance Indicators (KPIs).

24. The computer system of claim 17, further comprising program instructions to generate a benefit model representing an expected alert reduction rate across the IT infrastructure.

* * * * *